US009102885B2

(12) United States Patent
Simard et al.

(10) Patent No.: US 9,102,885 B2
(45) Date of Patent: Aug. 11, 2015

(54) METHOD OF TRANSPORTING VISCOUS SLURRIES

(71) Applicant: Renmatix, Inc., King of Prussia, PA (US)

(72) Inventors: Michel Adam Simard, Berwyn, PA (US); Perry Gerdes, Kimberling City, MO (US)

(73) Assignee: Renmatix, Inc., King of Prussia, PA (US)

( * ) Notice: Subject to any disclaimer, the term of this patent is extended or adjusted under 35 U.S.C. 154(b) by 0 days.

(21) Appl. No.: 13/951,593

(22) Filed: Jul. 26, 2013

(65) Prior Publication Data

US 2015/0027438 A1 Jan. 29, 2015

(51) Int. Cl.
*C08B 1/00* (2006.01)
*C10L 9/08* (2006.01)
*C13K 1/02* (2006.01)

(52) U.S. Cl.
CPC .. *C10L 9/086* (2013.01); *C13K 1/02* (2013.01)

(58) Field of Classification Search
None
See application file for complete search history.

(56) References Cited

U.S. PATENT DOCUMENTS

| | | | | |
|---|---|---|---|---|
| 4,094,616 | A | 6/1978 | Lew | |
| 4,206,610 | A | 6/1980 | Santhanam | |
| 4,279,663 | A | 7/1981 | Burroughs et al. | |
| 4,316,747 | A | 2/1982 | Rugg et al. | |
| 4,316,748 | A | 2/1982 | Rugg et al. | |
| 4,624,684 | A | 11/1986 | Stevenson | |
| 5,411,594 | A | 5/1995 | Brelsford | |
| 7,736,511 | B2 * | 6/2010 | Lugowski et al. | 210/603 |
| 7,909,895 | B2 * | 3/2011 | Dickinson et al. | 44/307 |
| 8,017,820 | B2 | 9/2011 | Foody et al. | |
| 2003/0147301 | A1 | 8/2003 | Ekholm | |
| 2008/0107574 | A1 | 5/2008 | Olson | |
| 2009/0240088 | A1 | 9/2009 | Fenton et al. | |
| 2010/0326610 | A1 | 12/2010 | Harvey et al. | |
| 2011/0212499 | A1 | 9/2011 | Ladisch et al. | |
| 2011/0245444 | A1 * | 10/2011 | Miller et al. | 526/346 |
| 2013/0192138 | A1 * | 8/2013 | Hong | 48/127.5 |

FOREIGN PATENT DOCUMENTS

| | | | | |
|---|---|---|---|---|
| CN | 101906324 | A | * | 12/2010 |
| EP | 1347092 | | | 9/2003 |
| JP | 60-209431 | A | | 10/1985 |
| JP | 62-131096 | A | | 6/1987 |
| JP | 63-152799 | | | 6/1988 |
| JP | 06-156725 | A | | 6/1994 |
| SU | 1482950 | | | 5/1989 |
| WO | 2006024242 | | | 3/2006 |
| WO | 2006034590 | | | 4/2006 |
| WO | 2009012779 | | | 1/2009 |
| WO | WO 2011119753 | A2 | * | 9/2011 |

OTHER PUBLICATIONS

Carrasco, "Thermo-mechano-chemical pretreatment of wood in a process development unit", Wood Science and Technology (1992), 26(6), 413-28 (Abstract only) (1 page).

(Continued)

*Primary Examiner* — Melvin C Mayes
*Assistant Examiner* — Stefanie Cohen
(74) *Attorney, Agent, or Firm* — Travis B Gasa; Ballard Spahr LLP

(57) ABSTRACT

Methods are disclosed for transporting viscous slurries, especially at high pressures, using fluid injection, especially steam injection.

26 Claims, 1 Drawing Sheet

(56) References Cited

OTHER PUBLICATIONS

Paul et al., "Thermochemical conversion of lignocellulosic biomass into biosolvents and biodiesel-like esters using acid hydrolysis with an emphasis on processing compostable urban waste", Abstract of Papers, 242nd ACS National Meeting & Exposition, Denver, CO, Aug. 28-Sep. 1, 2011 (Abstract only) (1 page).
International Search Report and Written Opinion mailed on Apr. 1, 2014 for Intl. Pat. App. No. PCT/US2013/052183 filed Jul. 26, 2013 (Applicant—Renmatix, Inc.; Inventors—Simard et al.) (10 pages).

* cited by examiner

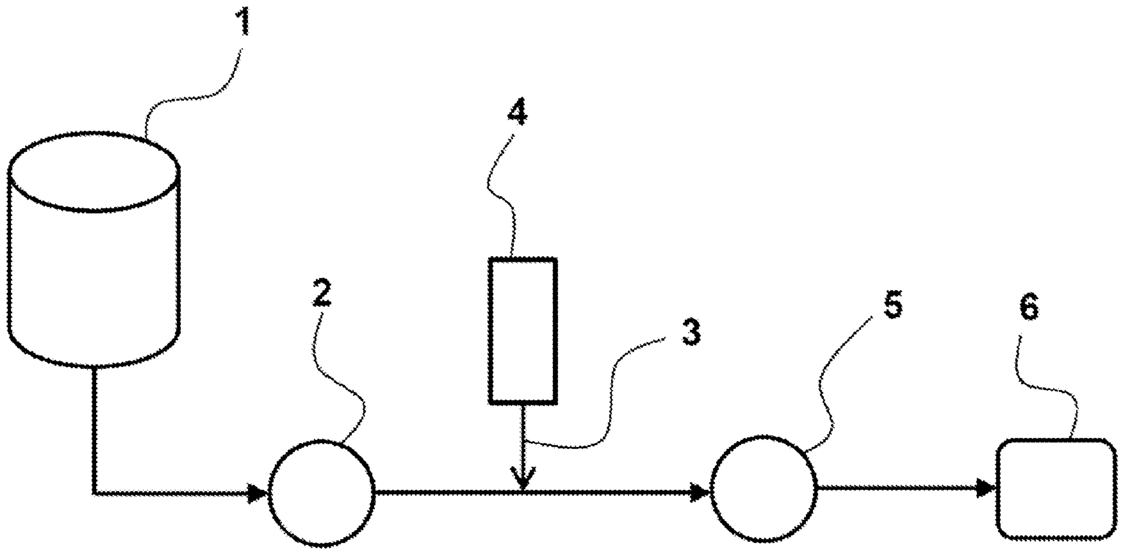
1
4
2
3
5
6

METHOD OF TRANSPORTING VISCOUS SLURRIES

FIELD OF THE INVENTION

The invention generally relates to methods of transporting viscous slurries. More particularly, the invention relates to methods of transporting viscous slurries at high pressures.

BACKGROUND OF THE INVENTION

There are many processes for converting biomass into useful products, such as fermentable sugars and other chemicals. Some of these biomass conversion processes require pumping biomass slurries to high pressures, such as about 500 psi to about 4000 psi or even higher. Processing biomass slurries at higher solids contents is more economical, because higher solids contents provide a higher output for a given plant size, as well as a lower processing cost, such as in heating, cooling, and concentration costs, because there is less water present. However, high solids content slurries typically are thick and viscous, and therefore are difficult, or sometimes impossible, to pump efficiently or effectively using conventional methods.

There are a limited number of high pressure pump technologies that can pump high solids content slurries to high pressure. These limitations are further exacerbated by the need for the pumps to handle high solids content slurries, which typically have high viscosities. Some have attempted to address these shortcomings by preheating the high solids content slurries in indirect contact heat exchangers. However, this solution often leads to fouling of the heater exchangers, thereby lowering operability, and has high attendant capital costs for the equipment. Furthermore, it is difficult to maintain a uniform temperature within the slurry in the heat exchangers. In addition, there is a significant pressure drop across the heat exchangers, which requires additional pumping power in an already difficult application.

Thus, there is an ongoing need for methods for pumping slurries to high pressures, especially for slurries having high solids contents or high viscosities. The methods of the present invention are directed toward these, as well as other, important ends.

SUMMARY OF THE INVENTION

In one embodiment, the invention is directed to methods, comprising, consisting of, or consisting essentially of:

providing a slurry at a first temperature and a first pressure, wherein said slurry comprises, consists of, or consists essentially of a liquid carrier and a solid;

increasing said first pressure to a second pressure of about 50 psia to about 1250 psia, thereby forming a first pressurized slurry;

injecting a fluid into said first pressurized slurry, thereby forming a fluid-injected slurry, wherein said fluid-injected slurry has a second temperature greater than said first temperature, and said second temperature is about 100° C. to about 300° C.; and increasing said second pressure to a third pressure of greater than about 1250 psia, thereby forming a second pressurized slurry.

In another embodiment, the invention is directed to methods, comprising, consisting of, or consisting essentially of:

providing a slurry at a first temperature of about 1° C. to about 50° C. and a first pressure of about 14 psia to about 50 psia;

wherein said slurry comprises, consists of, or consists essentially of a liquid carrier and a solid; and wherein said slurry has a viscosity of at least about 5,000 cP; injecting a fluid into said slurry to form a fluid-injected slurry;

wherein said fluid-injected slurry has a second temperature of less than about 100° C.; and wherein said second temperature is greater than said first temperature; and increasing said first pressure to a second pressure of about 1000 psia to about 6000 psia, thereby forming a pressurized slurry.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 1 is a schematic diagram showing one embodiment of the invention.

DETAILED DESCRIPTION OF THE INVENTION

As employed above and throughout the disclosure, the following terms, unless otherwise indicated, shall be understood to have the following meanings As used herein, the singular forms "a," "an," and "the" include the plural reference unless the context clearly indicates otherwise.

While the present invention is capable of being embodied in various forms, the description below of several embodiments is made with the understanding that the present disclosure is to be considered as an exemplification of the invention, and is not intended to limit the invention to the specific embodiments illustrated. Headings are provided for convenience only and are not to be construed to limit the invention in any manner. Embodiments illustrated under any heading may be combined with embodiments illustrated under any other heading.

The use of numerical values in the various quantitative values specified in this application, unless expressly indicated otherwise, are stated as approximations as though the minimum and maximum values within the stated ranges were both preceded by the word "about." In this manner, slight variations from a stated value can be used to achieve substantially the same results as the stated value. Also, the disclosure of ranges is intended as a continuous range including every value between the minimum and maximum values recited as well as any ranges that can be formed by such values. Also disclosed herein are any and all ratios (and ranges of any such ratios) that can be formed by dividing a recited numeric value into any other recited numeric value. Accordingly, the skilled person will appreciate that many such ratios, ranges, and ranges of ratios can be unambiguously derived from the numerical values presented herein and in all instances such ratios, ranges, and ranges of ratios represent various embodiments of the present invention.

A supercritical fluid is a fluid at a temperature above its critical temperature and at a pressure above its critical pressure. A supercritical fluid exists at or above its "critical point," the point of highest temperature and pressure at which the liquid and vapor (gas) phases can exist in equilibrium with one another. Above critical pressure and critical temperature, the distinction between liquid and gas phases disappears. A supercritical fluid possesses approximately the penetration properties of a gas simultaneously with the solvent properties of a liquid. Accordingly, supercritical fluid extraction has the benefit of high penetrability and good solvation.

Reported critical temperatures and pressures include: for pure water, a critical temperature of about 374.2° C., and a critical pressure of about 221 bar; for carbon dioxide, a critical temperature of about 31° C. and a critical pressure of about 72.9 atmospheres (about 1072 psig). Near-critical water has a temperature at or above about 300° C. and below the critical temperature of water (374.2° C.), and a pressure high enough to ensure that all fluid is in the liquid phase. Sub-critical water has a temperature of less than about 300° C. and a pressure high enough to ensure that all fluid is in the liquid phase. Sub-critical water temperature may be greater than about 250° C. and less than about 300° C., and in many instances sub-critical water has a temperature between about 250° C. and about 280° C. The term "hot compressed water" is used interchangeably herein for water that is at or above its critical state, or defined herein as near-critical or sub-critical, or any other temperature above about 50° C. (e.g., above about 100° C., above about 150° C., or above about 200° C.) but less than subcritical, and at pressures such that water is in a liquid state.

As used herein, a fluid which is "supercritical" (e.g. supercritical water, supercritical $CO_2$, etc.) indicates a fluid which would be supercritical if present in pure form under a given set of temperature and pressure conditions. For example, "supercritical water" indicates water present at a temperature of at least about 374.2° C. and a pressure of at least about 221 bar, whether the water is pure water, or present as a mixture (e.g. water and ethanol, water and $CO_2$, etc). Thus, for example, "a mixture of sub-critical water and supercritical carbon dioxide" indicates a mixture of water and carbon dioxide at a temperature and pressure above that of the critical point for carbon dioxide but below the critical point for water, regardless of whether the supercritical phase contains water and regardless of whether the water phase contains any carbon dioxide. For example, a mixture of sub-critical water and supercritical $CO_2$ may have a temperature of about 250° C. to about 280° C. and a pressure of at least about 225 bar.

As used herein, "slurry" refers to a mixture of solid particles in a liquid. In some embodiments, instead of a slurry, the methods of the invention can be performed with a solution comprising dissolved solids. In some embodiments of the invention, a slurry is used err the inventive methods, and the sherry contains both insoluble solids and dissolved solids.

As used herein, "continuous" indicates a process which is uninterrupted for its duration, or interrupted, paused or suspended only momentarily relative to the duration of the process. Treatment of biomass is "continuous" when biomass is fed into the apparatus without interruption or without a substantial interruption, or processing of said biomass is not done in a batch process.

As used herein, the term "biomass" means a renewable energy source generally comprising carbon-based biological material derived from recently-living organisms. The organisms may have been plants, animals, fungi, etc. Examples of biomass include without limitation wood, lignocellulosic biomass, waste feedstocks, manufacturing waste (wood residues such as sawmill and paper mill discards), agricultural residues (including corn stover, sugarcane bagasse, rice hulls, oat hulls, etc.), food waste, plastic, black liquor (a byproduct of wood pulping processes), etc. Wood can be, for example, hardwood, softwood, annual fibers, and combinations thereof. Biomass typically comprises cellulose, hemicellulose, and lignin. Any suitable type of biomass can be used as a feedstock for the invention described herein. Starch or any other type of natural or synthetic polymer or oligomer may also be used in the inventive process. Fossil fuels are generally not considered biomass even though ultimately derived from carbon-based biological material. The term "biomass" as used herein does not include fossil fuel sources.

As used herein, "fractionated biomass" refers to biomass, as defined herein, that has been subjected to a treatment process, whereby hemicellulose has been at least partially removed.

As used herein, "lignocellulosic biomass or a component part thereof" refers to plant biomass containing cellulose, hemicellulose, and lignin from a variety of sources, including, without limitation (1) agricultural residues (including corn stover and sugarcane bagasse), (2) dedicated energy crops, (3) wood residues (including sawmill and paper mill discards), and (4) municipal waste, and their constituent parts including without limitation, lignocellulose biomass itself, lignin, $C_6$ saccharides (including cellulose, cellobiose, $C_6$ oligosaccharides, $C_6$ monosaccharides, and $C_5$ saccharides (including hemicellulose, $C_5$ oligosaccharides, and $C_5$ monosaccharides).

As used herein, "polysaccharide" refers to linear or branched carbohydrate molecules of the same or different monosaccharide units joined together by glycosidic bonds having the general formula of $C_x(H_2O)_y$, where x is about 200 to about 18,000 or higher. Typically, natural polysaccharides present in biomass are composed of a long chain of $C_5$ and/or $C_6$ sugars. For example, when a polysaccharide is composed of $C_6$ monosaccharides, the general formula of a polysaccharide can be represented as $(C_6H_{10}O_5)_n$, where n is about 30 to about 3000 or more (i.e., the number of hexose monomers in the polysaccharide).

As used herein, "oligosaccharide" refers to linear or branched carbohydrate molecules of the same or different monosaccharide units joined together by glycosidic bonds having the general formula of $C_x(H_2O)_y$, where x is about 2 to about 200. Oligosaccharides can be thought of as shorter chain polysaccharides, i.e., polysaccharides simply having less monomers in the polymeric chain. When an oligosaccharide is composed of $C_6$ monosaccharides, the general formula of an oligosaccharide can be represented as $(C_6H_{10}O_5)_n$, where n is about 2 to about 30 (i.e., the number of hexose monomers in the oligosaccharide).

As used herein, "monosaccharide" refers to any of the class of sugars that cannot be hydrolyzed to give a simpler sugar. Monosaccharides typically are $C_5$ (e.g., xylose) and $C_6$ sugars (e.g., glucose), but may also include monosaccharides having other numbers of carbon, such as $C_2$, $C_3$, $C_4$, $C_7$, $C_8$, and so on.

As used herein, "$C_1$-$C_5$ alcohols" refers to linear or branched $C_1$-$C_5$ alkanes having one or more hydroxyl groups, or cyclic $C_3$-$C_5$ alkanes having one or more hydroxyl groups, including methanol, ethanol, 1-propanol, 2-propanol, 1,3-propandiol, cyclopropanol, 1-butanol, 2-butanol, cyclobutanol, 1,4-butandiol, 1-pentanol, 2-pentanol, 3-pentanol, 1,5-pentandiol, cyclopentanol, and combinations thereof.

As used herein, "water-miscible organic solvents" refers to organic solvents that are miscible with water at room temperature, including $C_1$-$C_5$ alcohols, acetaldehyde, acetic acid, acetone, acetonitrile, 1,2-butanediol, 1,3-butanediol, 1,4-butanediol, 2-butoxyethanol, butyric acid, diethanolamine, diethylenetriamine, dimethylformamide, dimethoxyethane, dimethyl sulfoxide, 1,4-dioxane, ethylamine, ethylene glycol, formic acid, furfuryl alcohol, glycerol, methyl diethanolamine, methyl isocyanide, 1,3-propanediol, 1,5-pentanediol, propanoic acid, propylene glycol, pyridine, tetrahydrofuran, triethylene glycol, and combinations thereof. Water-miscible organic solvents may be completely or substantially miscible with water. For example, as used herein, a water-miscible organic solvent that is "substantially miscible" with water means that, when the water-miscible organic solvent is added to water, at least about 50 wt. % (e.g., at least about 60 wt. %, at least about 70 wt. %, at least about 80 wt. %, at least about 90 wt. %, or at least about 99 wt. %) of the water-miscible organic solvent is miscible with water. As used herein, a water-miscible organic solvent that is "completely miscible" with water means that about 100 wt. % of the organic solvent is miscible with water. In contrast, "water-immiscible organic solvents" refers to organic solvents that are not completely or substantially miscible with water, as defined herein.

Accordingly, in one embodiment, the invention is directed to methods, comprising, consisting of, or consisting essentially of:

providing a slurry at a first temperature and a first pressure, wherein said slurry comprises, consists of, or consists essentially of a liquid carrier and a solid;

increasing said first pressure to a second pressure of about 50 psia to about 1250 psia, thereby forming a first pressurized slurry;

injecting a fluid into said first pressurized slurry, thereby forming a fluid-injected slurry, wherein said fluid-injected slurry has a second temperature greater than said first temperature, and said second temperature is about 100° C. to about 300° C.; and increasing said second pressure to a third pressure of greater than about 1250 psia, thereby forming a second pressurized slurry.

In another embodiment, the invention is directed to methods, comprising, consisting of, or consisting essentially of:

providing a slurry at a first temperature of about 1° C. to about 50° C. and a first pressure of about 14 psia to about 50 psia;

wherein said slurry comprises, consists of, or consists essentially of a liquid carrier and a solid; and wherein said slurry has a viscosity of at least about 5,000 cP; injecting a fluid into said slurry to form a fluid-injected slurry;

wherein said fluid-injected slurry has a second temperature of less than about 100° C.; and wherein said second temperature is greater than said first temperature; and increasing said first pressure to a second pressure of about 1000 psia to about 6000 psia, thereby forming a pressurized slurry.

In some embodiments of the invention, the slurry has a solids content of about 5 wt. % or more, e.g., about 6 wt. % or more, about 7 wt. % or more, about 8 wt. % or more, about 9 wt. % or more, about 10 wt. % or more, about 11 wt. % or more, about 12 wt. % or more, about 13 wt. % or more, about 14 wt. % or more, about 15 wt. % or more, about 16 wt. % or more, about 17 wt. % or more, about 18 wt. % or more, about 19 wt. % or more, about 20 wt. % or more, about 21 wt. % or more, about 22 wt. % or more, about 23 wt. % or more, about 24 wt. % or more, about 25 wt. % or more, about 26 wt. % or more, about 27 wt. % or more, about 28 wt. % or more, about 29 wt. % or more, or about 30 wt. % or more, based on the total weight of the slurry. Alternatively, or in addition, the slurry has a solids content of about 31 wt. % or less, e.g., about 30 wt. % or less, about 29 wt. % or less, about 28 wt. % or less, about 27 wt. % or less, about 26 wt. % or less, about 25 wt. % or less, about 24 wt. % or less, about 23 wt. % or less, about 22 wt. % or less, about 21 wt. % or less, about 20 wt. % or less, about 19 wt. % or less, about 18 wt. % or less, about 17 wt. % or less, about 16 wt. % or less, about 15 wt. % or less, about 14 wt. % or less, about 13 wt. % or less, about 12 wt. % or less, about 11 wt. % or less, about 10 wt. % or less, about 9 wt. % or less, about 8 wt. % or less, about 7 wt. % or less, or about 6 wt. % or less, based on the total weight of the slurry. Thus, the slurry can have a solids content bounded by any two of the foregoing endpoints. For example, the slurry can have a solids content of about 15 wt. % to about 21 wt. %, about 9 wt. % to about 16 wt. %, or about 22 wt. % to about 31 wt. %, based on the total weight of the slurry. In a preferred embodiment, the solids content of the slurry is about 10 wt. % to about 30 wt. %, more preferably about 15 wt. % to about 25 wt. %, and most preferably about 19 wt. % to about 21 wt. %. The solids content, as used herein, may refer to the slurry, the first pressurized slurry, the fluid-injected slurry, and/or the second pressurized slurry.

In some embodiments of the invention, the fluid that is injected comprises, consists of, or consists essentially vapor, saturated vapor, superheated vapor, or combinations thereof. The fluid may be a single component, such as pure water, or a mixture of different components, such as water and ethanol (e.g., a $C_1$-$C_5$ alcohol). In the case of a fluid that is a mixture, it is possible for one of the components to be in one state while the other component(s) is (are) in a different state(s). For example, in a mixture of water and ethanol, at certain temperatures and pressures the ethanol may be in a superheated vapor state and the water may be in a saturated vapor state. A component that is a "vapor" indicates that the component would be in a vapor state, if present in pure form. A component that is a "saturated vapor" indicates that the component would be in a saturated vapor state, if present in pure form. A component that is a "superheated vapor" indicates that the component would be in a superheated vapor state, if present in pure form.

In some embodiments of the invention, the fluid that is injected comprises, consists of, or consists essentially of steam, saturated steam, or superheated steam, either as a single component, such as pure water, or as a mixture of water with at least one second component, such as water and ethanol (i.e., a $C_1$-$C_5$ alcohol). In the case of a fluid that is a mixture, it is possible for one of the components to be in one state while the other component(s) is (are) in a different state(s). For example in a mixture of water and ethanol, at certain temperatures and pressures, ethanol may be in a superheated vapor state and water may be in a saturated steam state. A component that is "steam" indicates that the water component would be steam, if present in pure form. A component that is a "saturated steam" indicates that the water component would be in a saturated steam state, if present in pure form. A water component that is "superheated steam" indicates that the water component would be in superheated steam state, if present in pure form.

In some embodiments of the invention, the fluid that is injected is specifically produced for the purpose of injection (e.g., by a steam boiler). In some embodiments, the fluid that is injected is a byproduct of a process performed at the same site or at a nearby site, and the recovered fluid is employed in the inventive process as a means to reuse and conserve energy. In some embodiments, the fluid that is injected is a mixture of purposely produced fluid and a recovered fluid.

In some embodiments, a method of the invention may further comprise adding to at least one of said slurry, said first pressurized slurry, said fluid-injected slurry, and said second pressurized slurry a component selected from the group consisting of helium, nitrogen, argon, oxygen, carbon dioxide, carbon monoxide, sulfur dioxide, hydrogen chloride, hydrogen, and combinations thereof. As used herein, nitrogen, oxygen, and hydrogen refer to the molecular species, not the elements. As used herein, the component is purposefully added to the specified version of the slurry. Components (e.g., oxygen and/or nitrogen) that are naturally dissolved in the specified version of the slurry, for example, as a result of the presence of oxygen and nitrogen in the atmosphere, are not included in the definition of adding one or more of the components to the specified version of the slurry, as used herein.

In some embodiments of the invention, at least one of the steps of increasing the first pressure to the second pressure and increasing the second pressure to the third pressure comprises using at least one pressurizing device selected from the group consisting of a pump, a screw feeder, a mechanical pressurizing device, and combinations thereof.

In some embodiments of the invention, at least one of said slurry and said first pressurized slurry has a first viscosity. The first viscosity typically is quite viscous as compared to the viscosity of pure water. By way of illustration, at 25° C., biomass slurries have a calculated viscosity of about 1,000,000 cP at a solids content of about 15 wt. %, a calculated viscosity of about 3,300,000 cP at a solids content of about 20 wt. %, and a calculated viscosity of about 7,100,000 cP at a solids content of about 25 wt. %. As described elsewhere herein, it is desirable to process biomass slurries at high solids contents to increase throughput and efficiency, as well as to conserve energy. However, biomass slurries can become extremely thick at solids contents of about 17-18 wt. %, and thus it is difficult to pump and process slurry at solids contents of 17-18 wt. % and above. The present invention, however, overcomes the problems associated with pumping such high solids content slurries having high viscosities. Regardless of the solids content of a slurry, the invention can benefit the pumping and processing of any viscous liquid (e.g., viscous slurry) having a first viscosity of about 5,000 cP or more, e.g., about 10,000 cP or more, about 15,000 cP or more, about 20,000 cP or more, about 25,000 cP or more, about 30,000 cP or more, about 35,000 cP or more, about 40,000 cP or more, about 45,000 cP or more, about 50,000 cP or more, about 55,000 cP or more, about 60,000 cP or more, about 65,000 cP or more, about 70,000 cP or more, about 75,000 cP or more, about 80,000 cP or more, about 85,000 cP or more, about 90,000 cP or more, about 95,000 cP or more, about 100,000 cP or more, about 150,000 cP or more, about 200,000 cP or more, about 250,000 cP or more, about 300,000 cP or more, about 350,000 cP or more, about 400,000 cP or more, about 450,000 cP or more, about 500,000 cP or more, about 600,000 cP or more, about 700,000 cP or more, about 800,000 cP or more, about 900,000 cP or more, about 1,000,000 cP or more, about 1,200,000 cP or more, about 1,400,000 cP or more, about 1,600,000 cP or more, about 1,800,000 cP or more, about 2,000,000 cP or more, about 2,200,000 cP or more, about 2,400,000 cP or more, about 2,600,000 cP or more, about 2,800,000 cP or more, about 3,000,000 cP or more, about 3,500,000 cP or more, about 4,000,000 cP or more, about 4,500,000 cP or more, about 5,000,000 cP or more, about 5,500,000 cP or more, about 6,000,000 cP or more, about 6,500,000 cP or more, about 7,000,000 cP or more, about 7,500,000 cP or more, about 8,000,000 cP or more, about 8,500,000 cP or more, about 9,000,000 cP or more, or about 9,500,000 cP or more. Alternatively, or in addition, regardless of the solids content of a slurry, the invention can benefit the pumping and processing of any viscous liquid (e.g., viscous slurry) having a first viscosity of about 10,000,000 cP or less, e.g., about 9,500,000 cP or less, about 9,000,000 cP or less, about 8,500,000 cP or less, about 8,000,000 cP or less, about 7,500,000 cP or less, about 7,000,000 cP or less, about 6,500,000 cP or less, about 6,000,000 cP or less, about 5,500,000 cP or less, about 5,000,000 cP or less, about 4,500,000 cP or less, about 4,000,000 cP or less, about 3,500,000 cP or less, about 3,000,000 cP or less, about 2,800,000 cP or less, about 2,600,000 cP or less, about 2,400,000 cP or less, about 2,200,000 cP or less, about 2,000,000 cP or less, about 1,800,000 cP or less, about 1,600,000 cP or less, about 1,400,000 cP or less, about 1,400,000 cP or less, about 1,200,000 cP or less, about 1,000,000 cP or less, about 900,000 cP or less, about 800,000 cP or less, about 700,000 cP or less, about 600,000 cP or less, about 500,000 cP or less, about 450,000 cP or less, about 400,000 cP or less, about 350,000 cP or less, about 300,000 cP or less, about 250,000 cP or less, about 200,000 cP or less, about 150,000 cP or less, about 100,000 cP or less, about 95,000 cP or less, about 90,000 cP or less, about 85,000 cP or less, about 80,000 cP or less, about 75,000 cP or less, about 70,000 cP or less, about 65,000 cP or less, about 60,000 cP or less, about 55,000 cP or less, about 50,000 cP or less, about 45,000 cP or less, about 40,000 cP or less, about 35,000 cP or less, about 30,000 cP or less, about 25,000 cP or less, about 20,000 cP or less, about 15,000 cP or less, or about 10,000 cP or less. Thus, the first viscosity can be bounded by any two of the foregoing endpoints. For example, the first viscosity can be about 15,000 cP to about 1,200,000 cP, about 35,000 cP to about 85,000 cP, or about 1,000,000 cP to about 8,000,000 cP.

Injecting a fluid into the slurry or the first pressurized slurry results in a fluid-injected slurry having a second viscosity. The second viscosity typically is lower than the first viscosity. In some embodiments of the invention, the fluid-injected slurry has a second viscosity that is no more than about 80%, e.g., no more than about 75%, 70%, 65%, 60%, 55%, 50%, 45%, 40%, 35%, 30%, 25%, 20%, 15%, 10%, or 5%, of the first viscosity. In a preferred embodiment, the second viscosity is about 15% to about 20% of the first viscosity. By way of illustration, at 200° C. (e.g., after fluid injection), biomass slurries have a calculated viscosity of about 170,000 cP at a solids content of about 15 wt. %, a calculated viscosity of about 560,000 cP at a solids content of about 20 wt. %, and a calculated viscosity of about 1,200,000 cP at a solids content of about 25 wt. %. The values (in cP) of the second viscosity can be calculated by multiplying any of the percentages disclosed hereinabove by any of the first viscosity values. For example, when the first viscosity is about 3,000,000 cP to about 4,000,000, a second viscosity that is about 20% of the first viscosity can be calculated to be about 600,000 cP to about 800,000 cP. Any second viscosity value (in cP) that can be calculated in this manner is considered to be inherently disclosed herein.

The slurry can have any suitable first pressure. In some embodiments of the invention, the first pressure is about 14 psia to about 50 psia. For example, the first pressure is about 14 psia or more, e.g., about 15 psia or more, about 20 psia or more, about 25 psia or more, about 30 psia or more, about 35 psia or more, about 40 psia or more, or about 45 psia or more. Alternatively, or in addition, the first pressure is about 50 psia or less, e.g., about 45 psia or less, about 40 psia or less, about 35 psia or less, about 30 psia or less, about 25 psia or less, about 20 psia or less, or about 15 psia or less. In a preferred embodiment, the first pressure is about 14.7 psia (i.e., the ambient pressure at sea level).

The first pressurized slurry can have any suitable second pressure, provided that the second pressure is greater than the first pressure. In some embodiments of the invention, the second pressure is about 50 psia to about 1250 psia. For example, the second pressure is about 50 psia or more, e.g., about 75 psia or more, about 100 psia or more, about 125 psia or more, about 150 psia or more, about 175 psia or more, about 200 psia or more, about 225 psia or more, about 250 psia or more, about 275 psia or more, about 300 psia or more, about 325 psia or more, about 350 psia or more, about 375 psia or more, about 400 psia or more, about 425 psia or more, about 450 psia or more, about 475 psia or more, about 500 psia or more, about 525 psia or more, about 550 psia or more, about 575 psia or more, about 600 psia or more, about 750 psia or more, about 800 psia or more, about 850 psia or more, about 900 psia or more, about 950 psia or more, about 1000 psia or more, about 1050 psia or more, about 1100 psia or more, about 1150 psia or more, or about 1200 psia or more. Alternatively, or in addition, the second pressure is about 1250 psia or less, e.g., about 1200 psia or less, about 1150 psia or less, about 1100 psia or less, about 1050 psia or less, about 1000 psia or less, about 950 psia or less, about 900 psia or less, about 850 psia or less, about 800 psia or less, about 750 psia or less, about 700 psia or less, about 650 psia or less, about 600 psia or less, about 575 psia or less, about 550 psia or less, about 500 psia or less, about 475 psia or less, about 450 psia or less, about 425 psia or less, about 400 psia or less, about 375 psia or less, about 350 psia or less, about 325 psia or less, about 300 psia or less, about 275 psia or less, about 250 psia or less, about 225 psia or less, about 200 psia or less, about 175 psia or less, about 150 psia or less, about 125 psia or less, about 100 psia or less, or about 75 psia or less. Thus, the second pressure can be bounded by any two of the foregoing endpoints. For example, the second pressure can be about 100 psia to about 850 psia, about 200 psia to about 575 psia, or about 450 psia to about 600 psia. In a preferred embodiment, the second pressure is about 70 psia to about 600 psia, more preferably about 200 psia to about 250 psia, and most preferably about 225 psia.

The second pressurized slurry can have any suitable third pressure, provided that the third pressure is higher than the second pressure. In some embodiments of the invention, the third pressure is greater than about 1250 psia. For example, the third pressure is about 1,200 psia or more, e.g., about 1,400 psia or more, about 1,600 psia or more, about 1,800 psia or more, about 2,000 psia or more, about 2,200 psia or more, about 2,400 psia or more, about 2,600 psia or more, about 2,800 psia or more, about 3,000 psia or more, about 3,200 psia or more, about 3,400 psia or more, about 3,600 psia or more, about 3,800 psia or more, about 4,000 psia or more, about 4,200 psia or more, about 4,400 psia or more, about 4,600 psia or more, about 4,800 psia or more, about 5,000 psia or more, about 5,200 psia or more, about 5,400 psia or more, about 5,600 psia or more, or about 5,800 psia or more. Alternatively, or in addition, the third pressure is about 6,000 psia or less, e.g., about 5,800 psia or less, about 5,600 psia or less, about 5,400 psia or less, about 5,200 psia or less, about 5,000 psia or less, about 4,800 psia or less, about 4,600 psia or less, about 4,400 psia or less, about 4,200 psia or less, about 4,000 psia or less, about 3,800 psia or less, about 3,600 psia or less, about 3,400 psia or less, about 3,200 psia or less, about 3,000 psia or less, about 2,800 psia or less, about 2,600 psia or less, about 2,400 psia or less, about 2,200 psia or less, about 2,000 psia or less, about 1,800 psia or less, about 1,600 psia or less, or about 1,400 psia or less. Thus, the third pressure can be bounded by any two of the foregoing endpoints. For example, the third pressure can be about 2,200 psia to about 2,800 psia, about 2,600 psia to about 6,000 psia, or about 3,000 psia to about 5,600 psia. In a preferred embodiment, the third pressure is about 2,000 to about 6,000 psia, more preferably about 3,200 psia to about 3,400 psia.

In some embodiments of the invention, prior to the injecting step, the fluid has a fourth pressure and a fourth temperature. In some embodiments, the fourth pressure is a saturation vapor pressure of the fluid at the fourth temperature. The fourth pressure typically is higher than the second pressure, such that the fluid can be injected into the first pressurized slurry. In some embodiments, the fourth pressure is about 1% (e.g., about 2%, 3%, 4%, 5%, 6%, 7%, 8%, 9%, 10%, 15%, 20%, 25%, 30%, 35%, 40%, 45%, 50%, 55%, 60%, 65%, 70%, 75%, or 80%) higher than the second pressure. Preferably, the fourth pressure is about 5% higher than the second pressure. Additionally, any of the foregoing percentages can be used as endpoints in a range. For example, the fourth pressure can be about 5% to about 45%, about 15% to about 30%, or about 3% to about 75% higher than the second pressure.

In some embodiments of the invention, the fluid-injected slurry is under a pressure sufficient to keep the fluid-injected slurry in a substantially liquid state.

The slurry can have any suitable first temperature. In some embodiments of the invention, the first temperature is about 1° C. to about 50° C. For example, the first temperature is about 1° C. or more, e.g., about 5° C. or more, about 10° C. or more, about 15° C. or more, about 20° C. or more, about 25° C. or more, about 30° C. or more, about 35° C. or more, about 40° C. or more, or about 45° C. or more. Alternatively, or in addition, the first temperature is about 50° C. or less, e.g., about 45° C. or less, about 40° C. or less, about 35° C. or less, about 30° C. or less, about 25° C. or less, about 20° C. or less, about 15° C. or less, about 10° C. or less, or about 5° C. or less. Thus, the first temperature can be bound by any two of the foregoing endpoints. For example, the first temperature can be about 5° C. to about 45° C., about 20° C. to about 35° C., or about 15° C. to about 50° C. In a preferred embodiment, the first temperature is about 20° C. to about 25° C.

The fluid-injected slurry can have any suitable second temperature. In some embodiments of the invention, the second temperature is about 100° C. to about 300° C. For example, the second temperature is about 100° C. or more, e.g., about 110° C. or more, about 120° C. or more, about 130° C. or more, about 140° C. or more, about 150° C. or more, about 160° C. or more, about 170° C. or more, about 180° C. or more, about 190° C. or more, about 200° C. or more, about 210° C. or more, about 220° C. or more, about 230° C. or more, about 240° C. or more, about 250° C. or more, about 260° C. or more, about 270° C. or more, about 280° C. or more, or about 290° C. or more. Alternatively, or in addition, the second temperature is about 300° C. or less, e.g., about 290° C. or less, about 280° C. or less, about 270° C. or less, about 260° C. or less, about 250° C. or less, about 240° C. or less, about 230° C. or less, about 220° C. or less, about 210° C. or less, about 200° C. or less, about 190° C. or less, about 180° C. or less, about 170° C. or less, about 160° C. or less, about 150° C. or less, about 140° C. or less, about 130° C. or less, about 120° C. or less, or about 110° C. or less. Thus, the second temperature can be bounded by any two of the foregoing endpoints. For example, the second temperature can be about 180° C. to about 230° C., about 160° C. to about 190° C., or about 210° C. to about 240° C. In a preferred embodiment, the second temperature is about 150° C. to about 250° C., more preferably about 180° C. to about 230° C., and most preferably about 200° C.

In some embodiments of the invention, the pH of the slurry, the first pressurized slurry, the fluid-injected slurry, and/or the second pressurized slurry can be adjusted via the addition of exogenous acid. As used herein, an "exogenous acid" is an acid that is purposefully added to a specified slurry and does not include acid that is naturally released from the biomass during processing. The pH of the specified slurry or slurries can be adjusted to any suitable pH. For example, the pH can be adjusted to about 5 or less, e.g., about 4.5 or less, about 4 or less, about 3.5 or less, about 3 or less, about 2.5 or less, about 2 or less, about 1.5 or less, or about 1 or less. Alternatively, or in addition, the pH can be adjusted to about 0.5 or more, e.g., about 1 or more, about 1.5 or more, about 2 or more, about 2.5 or more, about 3 or more, about 3.5 or more, about 4 or more, or about 4.5 or more. Thus, the adjusted pH can be bounded by any two of the foregoing endpoints. For example, the adjusted pH can be about 0.5 to about 3, about 2.5 to about 3.5, or about 1 to about 3.5. In a preferred embodiment, the pH is about 3 or less. In another preferred embodiment, the methods of the invention are substantially free of exogenous acid. In some embodiments of the invention, an exogenous acid is not employed.

Any suitable compound can be used for pH adjustment. In some embodiments where at least one exogenous acid is employed, the exogenous acid comprises, consists of, or consists essentially of an organic acid, an inorganic acid, or combinations thereof. In some embodiments, the exogenous acid comprises, consists of, or consists essentially of sulfuric acid, sulfonic acid, phosphoric acid, phosphonic acid, nitric acid, nitrous acid, hydrochloric acid, hydrofluoric acid, hydrobromic acid, hydroiodic acid, aliphatic carboxylic acids (such as acetic acid and formic acid), aromatic carboxylic acids (such as benzoic acid and salicylic acid), dicarboxylic acids (such as oxalic acid, phthalic acid, sebacic acid, and adipic acid), aliphatic fatty acids (such as oleic acid, palmitic acid, and stearic acid), aromatic fatty acids (such as phenylstearic acid), amino acids, carbonic acid (e.g., formed in situ by the addition of carbon dioxide), sulfurous acid (e.g., formed in situ by the addition of sulfur dioxide), or combinations thereof.

In some embodiments of the invention, the liquid carrier comprises a liquid selected from the group consisting of water, $C_1$-$C_5$ alcohols, water-miscible organic solvents, and combinations thereof. In some embodiments of the invention, the liquid carrier consists of water. In some embodiments of the invention, the liquid carrier comprises one or more water-immiscible organic solvents (e.g., toluene, hexane, nitromethane, and the like).

In some embodiments of the invention, the solid comprises a material selected from the group consisting of biomass, fractionated biomass, municipal solid waste, a polysaccharide, an oligosaccharide, and combinations thereof.

In some embodiments of the invention, the method is a continuous process. In some embodiments of the invention, the method is not a batch process.

In some embodiments of the invention, the method is performed in a tubular apparatus.

In some embodiments of the invention, the slurry or the first pressurized slurry is continuously flowing during the injecting step, especially where the method is performed in a tubular apparatus and especially where the fluid is injected into a flowing stream of slurry (any version) (rather than into a tank of slurry, even if the tank is continuously stirred). In some embodiments, the inventive method is a once-through process (as opposed to a process employing a recirculating loop or a closed loop).

In some embodiments of the invention, the method further comprises contacting the second pressurized slurry with a supercritical or near-critical fluid. In some embodiments, the supercritical or near-critical fluid comprises, consists of, or consists essentially of water.

The present invention is further defined in the following Examples, in which all parts and percentages are by weight, unless otherwise stated. It should be understood that these examples, while indicating preferred embodiments of the invention, are given by way of illustration only and are not to be construed as limiting in any manner. From the above discussion and these examples, one skilled in the art can ascertain the essential characteristics of this invention, and without departing from the spirit and scope thereof, can make various changes and modifications of the invention to adapt it to various usages and conditions.

EXAMPLES

With reference to FIG. 1, a slurry comprising lignocellulosic biomass in water is stored in storage tank 1. The slurry is then gravity fed into a low pressure pump 2, which pressurizes the slurry to form a first pressurized slurry. Alternatively, the slurry can be fed to the low pressure pump 2 by a screw feeder, a mechanical pressurizing device, conveyor, or alternative mechanical device (not shown). In an alternative embodiment, low pressure pump 2 may be eliminated and replaced with a screw feeder, a mechanical pressurizing device, conveyor, or alternative mechanical device (not shown), which pressurizes the slurry to form a first pressurized slurry.

Saturated vapor 3, such as saturated steam in the case of water as the injection fluid (or superheated vapor, such as superheated steam in the case of water as the injection fluid), is injected into the slurry line by one or more fluid injectors 4, thereby forming a fluid-injected slurry. The temperature of the slurry increases as the steam (in the case of water as the injection fluid) condenses to liquid water and releases its latent heat. Fluid typically is injected at a pressure that is slightly higher than the pressure of the slurry. Because temperature and pressure are interrelated, especially in the case of saturated vapor, the temperature of the fluid prior to injection typically is dictated by the required pressure necessary to ensure that the fluid has a pressure slightly higher than the slurry, such that the fluid is capable of being injected into the slurry. If the pressure of the fluid is excessively high, such that by consequence the temperature is also excessively high, some of the organic material in the slurry (e.g., monomeric sugars, polymerics, etc.) may degrade when contacted with the fluid having an excessively high temperature.

The fluid-injected slurry is then pumped to high pressure by high pressure pump 5. The high temperature and high pressure slurry (i.e., second pressurized slurry) may then be subjected to further processing 6, such as supercritical or near-critical treatment. During supercritical or near-critical treatment, the second pressurized slurry is contacted with a supercritical or near-critical fluid (e.g., water), which breaks down the organic components of biomass (e.g., polysaccharides) into simpler compounds (e.g., oligosaccharides and monosaccharides).

The injection fluid may be a liquid or a vapor, or a combination thereof. Although hot liquid may be injected to heat the slurry, it is advantageous to use a vapor, because the vapor releases latent heat upon condensation, which has a much higher heating value than the specific heat of a liquid. As a result of the higher heating value of a condensing vapor, the use of vapor as the injection fluid also reduces the quantity of liquid that is effectively added to the slurry upon vapor condensation, as compared to the amount of hot fluid that would be required to achieve the same slurry temperature, thereby avoiding unnecessary dilution of the slurry.

Once the slurry is heated, it is easier to pump to high pressure because the viscosity decreases inversely with temperature, enabling pumping of a slurry with a higher solids content. This process makes the invention more economical and lowers the power required to pump, which also results in beneficial energy savings. This method is superior to prior art methods for pumping high viscosity slurries to high pressure, including those methods that employ heat exchangers, which are capital intensive and have fouling problems. In addition, the direct heating by fluid injection is more efficient than indirect heating through the use of heat exchangers, and also is not associated with the pressure drop issues that plague methods employing heat exchangers.

While the preferred forms of the invention have been disclosed, it will be apparent to those skilled in the art that various changes and modifications may be made that will achieve some of the advantages of the invention without departing from the spirit and scope of the invention. Therefore, the scope of the invention is to be determined solely by the claims to be appended.

When ranges are used herein for physical properties, such as temperature ranges and pressure ranges, or chemical properties, such as chemical formulae, all combinations, and subcombinations of ranges specific embodiments therein are intended to be included.

The disclosures of each patent, patent application, and publication cited or described in this document are hereby incorporated herein by reference, in their entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed is:

1. A method, comprising:

providing a slurry at a first temperature and a first pressure, wherein said slurry comprises a liquid carrier and a solid;

increasing said first pressure to a second pressure of about 50 psia to about 1250 psia, thereby forming a first pressurized slurry;

injecting a fluid into said first pressurized slurry, thereby forming a fluid-injected slurry, wherein said fluid-injected slurry has a second temperature greater than said first temperature, and said second temperature is about 100° C. to about 300° C.; and increasing said second pressure to a third pressure of greater than about 1250 psia, thereby forming a second pressurized slurry.

2. The method of claim 1, wherein said solid is present in an amount of at least about 5% by weight, based on the total weight of said slurry.

3. The method of claim 1, wherein said fluid is selected from the group consisting of vapor, saturated vapor, superheated vapor, and combinations thereof.

4. The method of claim 1, wherein said fluid is selected from the group consisting of steam, saturated steam, superheated steam, and combinations thereof.

5. The method of claim 1, further comprising:

adding to at least one of said slurry, said first pressurized slurry, said fluid-injected slurry, and said second pressurized slurry a component selected from the group consisting of helium, nitrogen, argon, oxygen, carbon dioxide, carbon monoxide, sulfur dioxide, hydrogen chloride, and hydrogen.

6. The method of claim 1, wherein at least one of said increasing said first pressure to said second pressure and said increasing said second pressure to said third pressure comprises using at least one pressurizing device selected from the group consisting of a pump, a screw feeder, a mechanical pressurizing device, and combinations thereof.

7. The method of claim 1, wherein at least one of said slurry and said first pressurized slurry has a first viscosity of at least about 5,000 cP.

8. The method of claim 7, wherein said fluid-injected slurry has a second viscosity that is no more than about 80% of said first viscosity.

9. The method of claim 1, wherein said first pressure is about 14 psia to about 50 psia.

10. The method of claim 1, wherein said second pressure is about 70 psia to about 600 psia.

11. The method of claim 1, wherein said third pressure is about 2000 psia to about 6000 psia.

12. The method of claim 11, wherein said third pressure is about 3200 psia to about 3800 psia.

13. The method of claim 1, wherein, prior to said injecting, said fluid has a fourth pressure and a fourth temperature, and wherein said fourth pressure is a saturation vapor pressure of said fluid at said fourth temperature.

14. The method of claim 1, wherein said fluid-injected slurry is under a pressure sufficient to keep said fluid-injected slurry in a substantially liquid state.

15. The method of claim 1, wherein said first temperature is about 1° C. to about 50° C.

16. The method of claim 1, wherein said second temperature is about 150° C. to about 250° C.

17. The method of claim 1, wherein said method is substantially free of exogenous acid.

18. The method of claim 1, wherein said liquid carrier comprises a liquid selected from the group consisting of water, $C_1$-$C_5$ alcohols, water-miscible organic solvents, and combinations thereof.

19. The method of claim 1, wherein said liquid carrier comprises water.

20. The method of claim 1, wherein said solid comprises a material selected from the group consisting of biomass, fractionated biomass, municipal solid waste, a polysaccharide, an oligosaccharide, and combinations thereof.

21. The method of claim 1, wherein said method is a continuous process.

22. The method of claim 1, wherein said method is performed in a tubular apparatus.

23. The method of claim 1, wherein said slurry or said first pressurized slurry is continuously flowing during said injecting.

24. The method of claim 1, further comprising:

contacting said second pressurized slurry with a supercritical or near-critical fluid comprising water.

25. A method, comprising:

providing a slurry at a first temperature of about 1° C. to about 50° C. and a first pressure of about 14 psia to about 50 psia;

wherein said slurry comprises a liquid carrier and a solid; and wherein said slurry has a viscosity of at least about 5,000 cP;

injecting a fluid into said slurry to form a fluid-injected slurry;

wherein said fluid-injected slurry has a second temperature of less than about 100° C.; and wherein said second temperature is greater than said first temperature;

increasing said first pressure to a second pressure of about 1000 psia to about 6000 psia, thereby forming a pressurized slurry; and contacting said pressurized slurry with a supercritical or near-critical fluid comprising water.

26. The method of claim 25, wherein said liquid carrier comprises water; and said solid comprises a material selected from the group consisting of biomass, fractionated biomass, municipal solid waste, a polysaccharide, an oligosaccharide, and combinations thereof.

* * * * *